(12) United States Patent
Chafle et al.

(10) Patent No.: US 8,458,002 B2
(45) Date of Patent: Jun. 4, 2013

(54) SERVICE SCHEDULING

(75) Inventors: Girish B. Chafle, New Delhi (IN);
Dinesh Garg, Rajasthan (IN); Prashant Jain, Delhi (IN); Vikas Kedia, Hyderabad (IN); Sameep Mehta, New Delhi (IN); Gyana R. Parija, Haryana (IN); Anju Tandon, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/185,897

(22) Filed: Aug. 5, 2008

(65) Prior Publication Data

US 2010/0036690 A1    Feb. 11, 2010

(51) Int. Cl.
*G06Q 10/00* (2012.01)

(52) U.S. Cl.
USPC ........................................ 705/7.13; 705/7.14

(58) Field of Classification Search
USPC ...................................................... 705/7, 8, 9
See application file for complete search history.

(56) References Cited

U.S. PATENT DOCUMENTS

| | | | |
|---|---|---|---|
| 4,700,295 A | | 10/1987 | Katsof et al. |
| 5,615,121 A | * | 3/1997 | Babayev et al. ............. 705/7.22 |
| 5,963,911 A | | 10/1999 | Walker et al. |
| 6,415,259 B1 | * | 7/2002 | Wolfinger et al. ........... 705/7.13 |
| 6,421,651 B1 | * | 7/2002 | Tedesco et al. ............. 705/7.26 |
| 2002/0107715 A1 | * | 8/2002 | Pace et al. ......................... 705/8 |
| 2004/0044585 A1 | * | 3/2004 | Franco ............................ 705/26 |
| 2006/0026052 A1 | * | 2/2006 | Klett et al. ........................ 705/8 |
| 2006/0147005 A1 | * | 7/2006 | Taub ......................... 379/114.2 |
| 2006/0253358 A1 | * | 11/2006 | Delgrosso et al. ............. 705/35 |
| 2007/0136110 A1 | * | 6/2007 | Presley et al. ..................... 705/5 |
| 2008/0046304 A1 | * | 2/2008 | Dean ................................. 705/9 |
| 2008/0059274 A1 | * | 3/2008 | Holliday ............................ 705/8 |
| 2008/0091446 A1 | * | 4/2008 | Vengerov et al. ................. 705/1 |
| 2008/0275751 A1 | * | 11/2008 | Flockhart et al. ................. 705/8 |
| 2009/0037306 A1 | * | 2/2009 | Hill .................................. 705/35 |
| 2009/0076875 A1 | * | 3/2009 | Lert et al. .......................... 705/8 |
| 2010/0036690 A1 | * | 2/2010 | Chafle et al. ..................... 705/7 |

OTHER PUBLICATIONS

Qtech Queueing System, http://www.qtechsg.com/standard.HTM.
Apache Tomcat, http://tomcat.apache.org/.
Goemans, Improved Approximation Algorithms for Scheduling with Release Dates, pp. 591-598.
Lonsto Queue Management System, http://www.lonsto.co.uk/.
Chakaravarthy et al., On Scheduling Aspects of Executing Critical Tasks, IBM India Research Laboratory, pp. 1-3.
Db2 Product Family, http://www-306.ibm.com/software/data/db2/.
Advanced Queue Management System. http://www.databyteindia.com/queue-management.html.
Chekuri et al., Approximation Techniques for Average Completion Time Scheduling, pp. 1-35.
Automatic Queu Management System, http://www.qms-akis.com/en/?gclid=CJ31sNTtkZQCFRxxbgodtS8otQ.
Dynamic Queu Management System, http://www.intellvisions.com/products/optiq.html.
Queue Management System, http://www.rts.com/index.asp.
Smart Queue Management System, http://www.batworld.com/.

* cited by examiner

*Primary Examiner* — John Hayes
*Assistant Examiner* — Brian Epstein
(74) *Attorney, Agent, or Firm* — Ryan, Mason & Lewis, LLP (57) ABSTRACT

Techniques for scheduling one or more services are provided. The techniques include obtaining customer information, obtaining one or more service characteristics for each of the one or more services, and using the customer information and the one or more service characteristics to schedule the one or more services.

20 Claims, 5 Drawing Sheets

FIG. 1

```
1  Input: Dynamic list of C, AT, P, S
2  Input: M, F, R
3  Variable: IsCustomerServed, IsResourceFree, TempCT
4  While(∃_i s.t. IsCustomerServed(i)==0) {
5    IsServedLocal =0
6    TempCT =CT
7    (C', A', P') = Pick(M, CT)
8    A = SF(C', AT', P', CT)
9    RL = Convert(A)
10   While(∃_j s.t. IsCustomerServed(j)==0 && (TempCT−CT)≤ F }
11     if(∃_k s.t. (IsResourceFree(k)==1)) {
12       Dispatch $RL_l$ to $Resource_k$ s.t. $IsCustomerServed(RL_i)$==0 && ∀_{l'≤l} $IsCustomerServed(RL_{l'})$==1
13       IsResourceFree(k)==1
14       $IsCustomerServed(RL_i)$==1
16     }
17   }
18 }
```

SERVICE SCHEDULING

FIELD OF THE INVENTION

This disclosure generally relates to information technology, and, more particularly, to scheduling services.

BACKGROUND OF THE INVENTION

Retail banks attempt to grow business by cross-selling to the customers visiting branches. However, customers generally want to be served first, and retail banks lose market share in absence of smart customer segmentation and speed of service. As such, customer service is a key driver to retain and grow a customer base.

One solution to achieve faster service is that a bank can invest more in their branches. This will lead to higher operational costs (for example, larger real estate, more tellers, etc.). Such a problem becomes exacerbated if a retail bank is serving a large number of customers in a branch (typical, for example, in developing countries such as India, China, Brazil, Thailand, etc.). Legal regulations create additional demands on the cost of serving customers (for example, in Brazil there are legal regulations to limit the time a customer spends waiting in line for branch tellers). Failure to comply can result in monetary penalties being imposed on the bank.

Existing queue management approaches help bank schedule services, typically using a FIFO scheduling policy. However, existing approaches do not capture and/or take customer profiles or service characteristics into account, nor do existing approaches optimize on available resources. Additionally, existing approaches do not support a feature to generate management information systems (MIS) reports, nor do they offer automatic priority based dynamic scheduling. Generally, in existing approaches, a branch supervisor needs to identify customer and service priorities based on manual observations. Hence, a smart queue management needs a smart supervisor to constantly observe the queues and make adjustments to the allocation of customers to service counters.

Existing approaches do not provide a differentiated service to customers based on customer profiles and/or service characteristics. Further, existing scheduling systems cannot simultaneously take into account customer satisfaction (average wait time) and bank/service profitability (customer segmentation). Existing approaches additionally do not consider dynamic availability of resources, and do not include a concept of customer profile and prioritized service or real time capability (online).

Some existing approaches forecasts arrival pattern of customers based on historical data and uses that to schedule tellers. However, such approaches do not perform real time scheduling using actual arrival of customers, do not handle dynamic resource availability, and do not provide differentiated services.

Other existing approaches include, for example, allocating resources to jobs, where each job has a time-dependent cost function and each resource has a time at which it becomes available. Such approaches do not take into account job categorization and providing preferential treatment to critical and/or remunerative jobs, nor do such approaches take into account customer profiles and providing preferential treatment to important customers.

SUMMARY OF THE INVENTION

Principles of this disclosure provide techniques for scheduling services. An exemplary method (which may be computer-implemented) for scheduling one or more services, according to one aspect of the invention, can include steps of obtaining customer information, obtaining one or more service characteristics for each of the one or more services, and using the customer information and the one or more service characteristics to schedule the one or more services.

At least one embodiment of this invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of this disclosure will become apparent from the following detailed description of illustrative embodiments thereof, which is to be read in connection with the accompanying drawings.

DETAILED DESCRIPTION OF PREFERRED EMBODIMENTS

Principles of this disclosure include techniques for real time scheduling of services (for example, in a retail bank) that simultaneously considers service characteristics and a client profile for differentiated quality of service (QoS) in the presence of dynamic resource availability. The techniques described herein provide differentiate QoS to different clients based on client profiles (for example, for banking, home customers versus non-customers), disaster management (for example, a frequent fire region versus a non-frequent one), the service requested (for example, remunerative versus non-remunerative services, size of fire reported (criticality), etc.), and the dynamic resources available (for example, the number of tellers available, the number of fire fighters and/or trucks available, etc.).

Typically, services are scheduled using, for example, first in, first out (FIFO) and ubiquitous token dispensing machines in banking. However, in light of the disadvantageous existing approaches detailed above, there is a need to define and automate a real time queue management (for example, at branches of large retail banks) that allows dynamic application of segmentation of customers, characteristics of services and achieves reduced wait time for different services at a single window counter.

One or more embodiments of the invention include components to capture a customer profile and service characteristics and simultaneously use that information to schedule services. As such, the techniques described herein provide intelligent scheduling of services to reduce the overall average wait time. Additionally, one or more embodiments of the invention include priority based scheduling to give differentiated service to customers. Scheduling priority can be based, for example, on the customer profile, which can include the type of customer (home, non-home, etc.) as well as the value and/or net worth of the customer. Scheduling priority can also be based, for example, on service characteristics such as service time of each service, profitability of the service, etc.

One or more embodiments of the invention can be integrated with the Core Banking System (CBS), and can include components such as, for example, a master configuration, a token generator, a scheduler, a data repository and a display. Parameters of one or more embodiments of the present invention can include inputs to the master configuration such as, for example, available resources with time intervals for which each resource is available, available tellers operating for the day, and scheduler configuration including frequency of running the scheduler, starvation times for categories, and dynamic teller availability.

Inputs can also include service characteristics such as, for example, a service mix for each request, a unique identifier (ID) allocated to each request and an entry timestamp. Additionally, for customers (demand), inputs can include, for example, a customer profile including a value, net worth, segment, etc., service types to undertake (multiple) and number of services for each type, token ID allocated to the customer, and entry timestamp.

One or more embodiments can also include inputs of information about available tellers (supply) that can include, for example, teller ID, services supported by the teller, productivity (service time), scheduled breaks, and if the teller is active (true or false). Inputs can also include resources such as a resource ID, type of requests that can be serviced by each resource, and productivity (service time) for each request type. Further, outputs of one or more embodiments of the invention can include, for example, a ranked ordered list of customers.

As noted herein, one or more embodiments of the invention can include master configuration that includes an interface for a branch manager. The master configuration can also capture static information about services such as service time and profitability. Additionally, one or more embodiments of the invention can include a token generator that is capable of capturing customer information, capturing service details at a fine level of granularity, generating a token, creating pre-filled forms, etc. Service information can be populated on the teller screen, for example, by integrating with CBS leading to a paperless branch.

One or more embodiments of the present invention can also include a data repository and a display. A data repository can include, for example, configuration of the system (for example, a daily master configuration entered by a branch manager), information about customers and services, a schedule of services and an assignment of services to tellers. A display can include, for example, an interface showing assignment of customers and/or services to tellers and an interface showing missed tokens.

As described herein, one or more embodiments of the invention simultaneously take into account items such as, for example, customer profiles, job profiles, dynamic resources and real time workload. The techniques described herein improve overall QoS for enterprises such as, for example, banking (average wait time of all customers) and fire program analysis (FPA) (stopping a fire before it becomes critical).

QoS can also be improved in preferential categories such as, for banking, a decrease in overall wait time (for example, for home customers) and, for FPA, frequent fires attended to first and/or fires in wildland-urban interface areas attended to first.

One or more embodiments of the invention can also improve profitability of enterprises such as banking (for example, revenue by serving checks, demand drafts (DDs) and/or Challans earlier than another service account (for example, a public provident fund (PPF)) and FPA (for example, fires which may become critical (for example, high intensity fires) are handled first. Additionally, the techniques described herein are applicable in multiple domains.

An illustrative embodiment of the present invention can include an end to end system for retail bank branches to intelligently schedule services based on customer segment, for example, by reducing overall average wait time, providing differentiated service to customers, targeting new relationships by cross-selling based on customer segmentation and managing costs by differentiating between remunerative and non-remunerative services.

Additionally, one or more embodiments of the invention can include capturing customer profiles and service characteristics and implementing simultaneous usage of the information to schedule services and provide differentiated service using priority based scheduling, as well as the ability to generate MIS reports.

The techniques described herein can, for example, lead to improvement in customer satisfaction by reducing the average wait time; provide retail banks with the ability to give differentiated service to its customers as well as the ability to generate detailed MIS reports to perform various analyses by bank management. Also, one or more embodiments of the invention can be implemented in industries such as, for example, travel, transportation, and hospitals.

One or more embodiments of the invention include an optimization problem formulation, heuristics, as well as various parameters and methodology that can be adopted for assigning values to them. Basic notations used herein can include, for example, the following.

$C=\{C1, C2, \ldots, CN\}$ denotes the list of N customers and AT represents corresponding arrival times. MS denotes the master list of K service types which can be availed by a customer. With each service type is associated expected processing time. This master time list is denoted by $MT=\{MT_1, MT_2, \ldots, MT_K\}$. The service bundle requested by $i^{th}$ customer is denoted by $SB_i=\{SB_i^1, SB_i^2, \ldots, SB_i^l\}$ where l is number of services requested by $i^{th}$ customer and $\forall_{j=1}^{l} SB_i^j \in MS$. The total time needed to process $SB_i$ is known as service time denoted by $S_i$. The service time $S_i$ is the sum of expected service time of all the services in $SB_i$. $S=\{S_1, S_2, \ldots, S_N\}$ denotes service times for all N customers. $P=\{P_1, P_2, \ldots, P_N\}$ denotes the priority for each customer. CT represents current time.

The scheduling and/or optimization problem can be viewed as an ordering and/or ranking problem, wherein the output of the scheduler is a ranked list (RL) of length N which specifies the order in which the N jobs should be processed. Alternatively, the problem can be posed as an assignment problem. One or more embodiments of the invention, for example, follow the latter approach. "A" denotes an N×N assignment matrix where $A_{i,j}=1$ implies that $i^{th}$ customer is assigned the $j^{th}$ rank. RL can be generated trivially by scanning A once and assigning $RL_j=i$ whenever $A_{i,j}=1$. The customer at 1st position can be simply accessed as $RL_1$.

As described herein, one objective is to minimize weighted average wait time. The corresponding objective function is $$\text{Minimize} \sum_{i=1}^{N}\sum_{l=1}^{N} P_i * A_{i,l} * \left( CT - AT_i + \sum_{j=1}^{N}\sum_{k=1}^{l-1} S_j * A_{j,k} \right), \quad (1)$$

subject to the following constraints.

One constraint is that each customer should be scheduled only once, that is, each column in A should add up to 1:

$$\forall_i \in [1, N], \sum_{j=1}^{n} A_{i,j} = 1 \quad (2)$$

Another constraint is that each customer must be scheduled, that is, A should have exactly N non-zero entries:

$$\sum_{i=1}^{N}\sum_{j=1}^{n} A_{i,j} = N \quad (3)$$

Note that the formulation is quadratic due to presence of $A_{i,l} \times A_{j,k}$ term in the objective function. The quadratic programs (QP) take considerable amount of time before producing a feasible solution. This property makes QP an impractical solution for a real time scenario. To get rid of this term, one or more embodiments of the invention use a dummy binary variable $\text{Dummy}_{i,l,j,k}$ such that $$\text{Dummy}_{i,l,j,k} = 1 \text{ iff } A_{i,l} = 1 \text{ and } A_{j,k} = 1. \quad (4)$$

Now, the linear objective function is:

$$\sum_{i=1}^{N}\sum_{l=1}^{N} P_i * A_{i,l} * CT - AT_i + \left( \sum_{j=1}^{N}\sum_{k=1}^{l-1} S_j * \text{Dummy}_{i,l,j,k} \right) \quad (5)$$

The condition in Equation 4 can be satisfied by adding following constraint:

$$\text{Dummy}_{i,l,j,k} = A_{i,l} \times A_{j,k} \quad (6)$$

However, this particular fashion of forcing the condition results in a quadratic constraint. One can re-write the constraint in linear fashion as follows:

$$\text{Dummy}_{i,l,j,k} = 1.9 \geq A_{i,l} \times A_{j,k} \quad (7)$$

When $A_{i,l}=1$ and $A_{j,j}=1$ the above inequality is satisfied only by assigning $\text{Dummy}_{i,l,j,k}=1$. In all other cases $\text{Dummy}_{i,l,j,k}$ will be assigned 0 to minimize the objective function.

As noted above, one or more embodiments of the invention also include heuristics. In converting the QP into a linear program (LP), one can introduce a number of constraints (as exemplified above). For example, for assigning 10 customers to 10 positions, we now have to satisfy 10×10×10×10 constraints, one for each entry in Dummy. This effects performance in an undesirable fashion and is not a scalable model. As such, one or more embodiments of the invention use the following heuristic.

For each customer, compute $P_i \times S_i$. Assume that priority 1 customers are more important that customers with priority 2. The priority is multiplied by the expected service time to generate weighted service time.

Also, sort the items in ascending order to generate the rank list. This will generate a ranking based on a weighted shortest job first (WSJF) policy.

One can, for example, use a small example to highlight the motivation of choosing such a heuristic. Consider the three customers (that is, A, B and C) in the Table below.

| Customer ID | Priority | Service Time | Weighted Service Time |
|---|---|---|---|
| A | 2 | 4 | 8 |
| B | 1 | 4 | 4 |
| C | 2 | 6 | 12 |

As per the heuristic, the schedule will be {B, A, C} with wait times {0, 4, 8} (average=3). Consider an alternate schedule generated by SJF (optimal scheduling policy) {A, B, C} which will result in same wait time vector and average. However, the second schedule is actually sub-optimal in this case because a low priority customer (A) is scheduled ahead of a high priority one (B). Intuitively, by using weighted service time, we are enforcing that the cost (importance) of a one time unit spent waiting in queue is different for different categories. In the current example, two units of waiting time for category 2 is equivalent to one unit to wait time for category 1. This weighing creates a differentiation among customers which can be used to achieve the final goal. The heuristic provides results close to optimal (generated by optimization module) while taking a fraction of time.

The above mentioned formulation is a static one. It assumes that scheduling is done once all customers have arrived. This is not always a realistic setting, for example, for a banking sector. As a result, in one or more embodiments, the formulation can be extended to handle real time (dynamic) customer arrival using a scheduling function SF(C', A', P', CT) where C'∈C, A' and P' are corresponding arrival times and priorities. The function minimizes the above-defined objective function at time CT and returns assignment matrix A.

One can also assume the existence of a function Pick(M, CT), wherein the function returns a list of M≦N customers from C along with their arrival times and priorities, which are then used by SF. Pick selects M transactions (or all if number of available transactions is less than M) according to some pre-specified criteria. The pseudo code 102 for dynamic scheduling is presented in FIG. 1.

F minutes denote the frequency of running the scheduler. Also, R denotes the number of resources which will provide service. In one or more embodiments of the invention, resources are considered to be exactly the same, that is, each resource can serve every request taking same amount of time.

Figure 1:
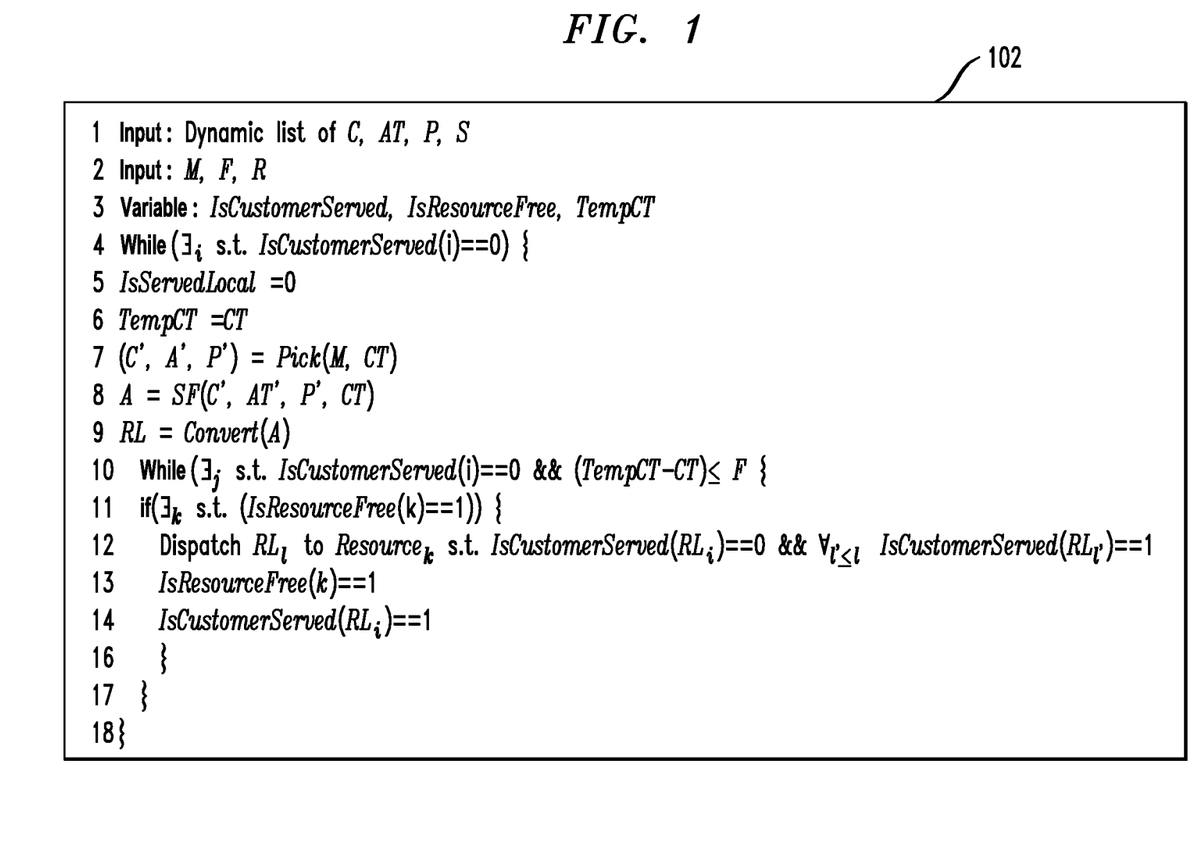
FIG. 1 is a diagram illustrating pseudo code for a real time transaction scheduler (RTTS), according to an embodiment of the present invention.

FIG. 1 depicts the pseudo code 102 for a real time transaction scheduler (RTTS). The program keeps scheduling every F minutes until there are un-served customers. In each iteration, the system picks M customers, schedules and dispatches to available resources. This process is repeated after every F minutes or when all M customers (from current iteration) are served, whichever is earlier. Line 1 and 2 of FIG. 1 lists the input parameters. Owing to the real time feature, the list of customers is dynamic, that is, new customers are appended at the end of the list.

Lines 3 and 4 outline the bookkeeping variables. IsCustomerServed maintains if a customer is served until the current time or not. IsCustomerServed maintains this information for all customers in a binary array. IsResourceFree is binary variable which maintains availability of resources.

Finally, TempCT stores time. The condition in line 5 ensures that all customers are scheduled. Every iteration in this loop corresponds to one iteration of the scheduler. Therefore, scheduler-specific variables are set in this loop.

Line 6 stores the current time (time at which scheduler is run) in TempCT. M customers are then picked (line 7) and scheduled (line 8). The rank order list is generated from the assignment matrix in line 9. Line 10 checks two conditions to ascertain if the to scheduler's next iteration should be run, or if customers from the current iteration should be dispatched to the resources. It checks if there exists an un-served customer from the M scheduled ones. It also checks if the time elapsed between current time and the time at which the current iteration of scheduler is less than the frequency F. If any of the condition does not hold, the current iteration of scheduler ends and the next iterations start. Line 12 checks if a resource is free to serve next customer. The highest ranked un-served customer is dispatched to the available resource. Also, lines 13-15 perform book keeping.

One or more embodiments of the invention also include handling starvation. The dynamic algorithm can lead some customers to starve, that is, the customers will have extraordinarily high wait times. As a result, one or more embodiments of the invention continuously update the priority of the customers. With each customer $C_i$, one can associate a maximum starvation time ($MST_i$). The priority of each customer is then updated as follows:

$$PNew_i = P_i \times \frac{MST_i - (CT - A_i)}{MST_i} \quad (8)$$

Note that $CT-A_i$ computes the already waited time. If a customer has waited for $MST_i$ minutes, its priority goes to 0 which implies that she now belongs to most important category and will be scheduled as soon as possible. The update function gradually adjusts the priority of each customer to avoid starvation. Also, note that $MST_i$ is not an upper bound on wait time. A customer may have to wait beyond MST if the system is over-saturated. For example, consider a queue of 200 customers with 40 customers served in one hour and MST=60 minutes. In this case, after 60 minutes, around 140 customers in the queue will be of priority 0. In such cases, the scheduling will reduce to FIFO policy as WSJF will be 0 for each waiting customer. In a real life setting, for example, this property can be particularly useful and desirable to manage crowd perception of fairness.

Deriving the optimal value of MST is domain specific. In one or more embodiments of the invention, one of three different ways can be used to derive this value for each customer. For example, one can use a single fixed value. Under this scheme, one can fix one single value of MST for all customers. The value can be derived by computing the wait time in historical data (without RTTS). MST is fixed as slightly greater than original wait time so that some customer (low priority) will now wait more before becoming most important, and this benefit will be passed onto higher priority customers. The drawback of this scheme is that the end point of the growth function for each customer is the same, that is, category 2 and 4 customers will wait for exactly MST minutes before transforming in category 0. This leads to less differentiation between categories.

Also, one can use a per category fixed value. To handle the problem in the above policy, one can assign different MST to different categories. The average wait time for each category is computed (without RTTS). MST for more important categories is set as less than original wait time, whereas for less important categories, MST is greater than average wait time. This ensures that important categories transform to a most important category (and hence scheduled) after waiting for less time than their original wait times. However, other categories will have to wait longer. This way of setting MSTs created differentiation among categories, but does not take into account the arrival pattern. As such, one or more embodiments of the invention include arrival pattern should in setting MST.

Consider the following example. Assume MST was found to be [40, 50, 60, 80] based on category-wise analysis of historical data. Now consider two different arrival patterns corresponding to a lean and peak demand period. In the first case, only 20 services are requested in 60 minutes. In this case, customers are not benefited by the high MST value. In the alternate case, consider 170 service requests. In this case, after 80 minutes, around 100 customers will be of priority 0. In both of these cases, MST is not performing the intended function.

Further, one can use a per customer dynamic value. In this case, one takes into account the arrival pattern for assigning a unique MST to each customer. Currently, banks, for example, use FIFO to serve customers. As soon as a customer walks in, one can simulate the existing queue (all customers already waiting in the bank) using FIFO and calculate what would have been the wait time of this customer under FIFO. This value is again adjusted based on the category of the customer. This policy takes into account category information, arrival pattern and current system state to assign MST for each customer.

Figure 2:
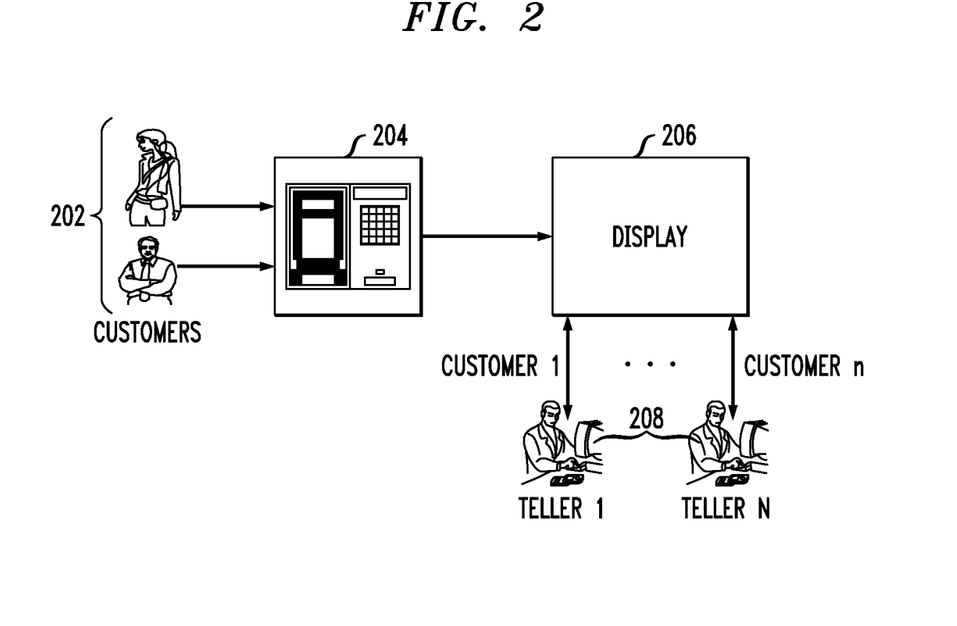
FIG. 2 is a diagram illustrating an existing system, according to an embodiment of the present invention.

FIG. 2 is a diagram illustrating an existing system, according to an embodiment of the invention. By way of illustration, FIG. 2 depicts customers 202, an interface 204, a display 206 and tellers 208. As noted herein, such existing approaches as the one depicted in FIG. 2 disadvantageously include a standalone system, simple FIFO scheduling, and a static system that does not offer automatic dynamic scheduling. Also, such an approach requires a smart branch manager, and similarly, a smart queue management needs a smart supervisor to constantly observe the queues and make adjustments to the allocation of customers to service counters.

Figure 3:
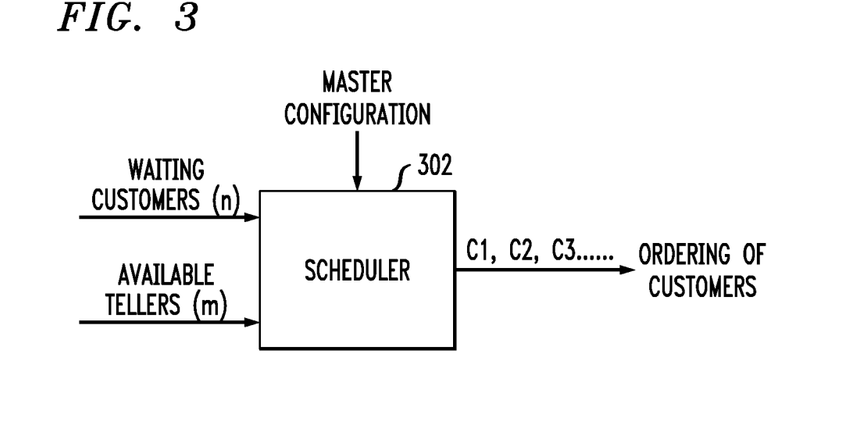
FIG. 3 is a diagram illustrating a scheduling system, according to an embodiment of the present invention.

FIG. 3 is a diagram illustrating a scheduling system, according to an embodiment of the invention. By way of illustration, FIG. 3 depicts a scheduler component 302, which can receive inputs such as information concerning waiting customers (identified by variable "n") and available tellers (identified by variable "m"), and master configuration information. Also, a scheduling system such as depicted in FIG. 3 can provide an output such as an ordering of customers (C1, C2, C3 . . . ).

Figure 4:
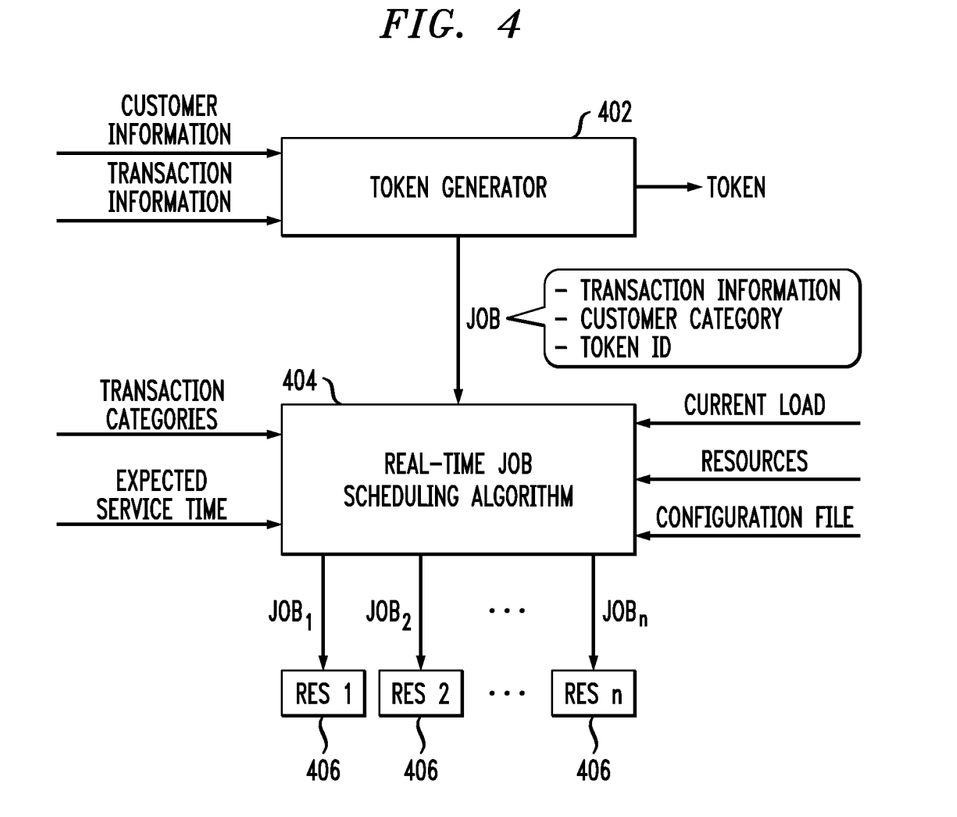
FIG. 4 is a diagram illustrating a scheduling system, according to an embodiment of the present invention.

FIG. 4 is a diagram illustrating a scheduling system, according to an embodiment of the invention. By way of illustration, FIG. 4 depicts a token generator 402, a real time job scheduling algorithm 404 and resources 406. As depicted in FIG. 4, the token generator 402 can receive inputs such as customer information and service information, while producing outputs such as, for example, a token and a job (that can include service information, a customer category and token ID). Also, the real-time job scheduling algorithm 404 can receive inputs such as service categories, expected service time, current load, resources and a configuration file, while producing outputs such as, for example, jobs (for example, an ordered set of jobs).

Figure 5:
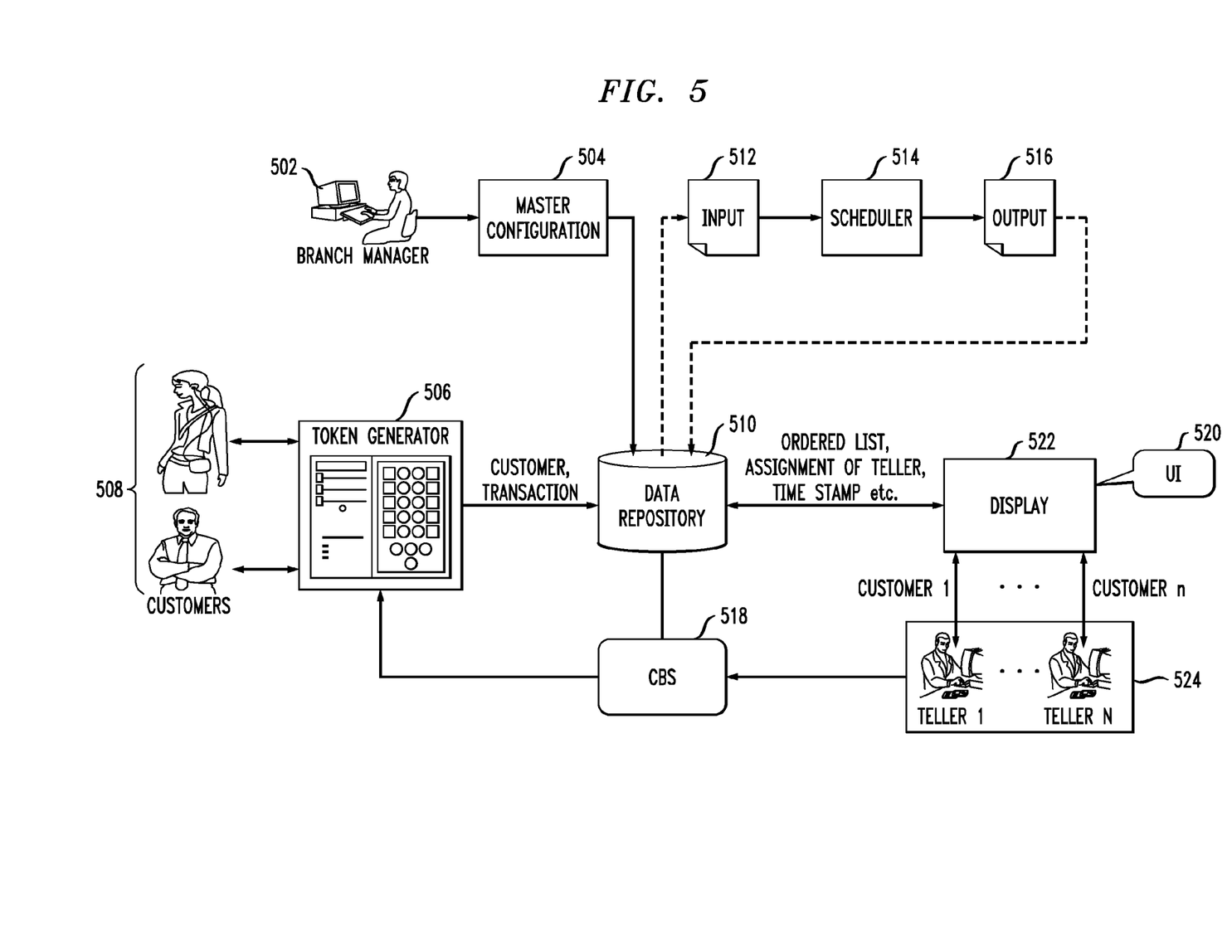
FIG. 5 is a diagram illustrating a scheduling system, according to an embodiment of the present invention.

FIG. 5 is a diagram illustrating a scheduling system, according to an embodiment of the invention. By way of illustration, FIG. 5 depicts the components of a branch manager 502, a master configuration 504, a token generator 506 (which interacts with customers 508), all of which provide inputs to a data repository 510. The data repository 510 provides an input 512 to the scheduler 514, which in turn produces an output 516. FIG. 5 also depicts the components of a core banking system (CBS) 518, a user interface (UI) 520, a display 522 (which can receive information from the data repository such as an ordered list, assignment of teller, time stamp, etc.), and a set of one or more tellers 524.

Figure 6:
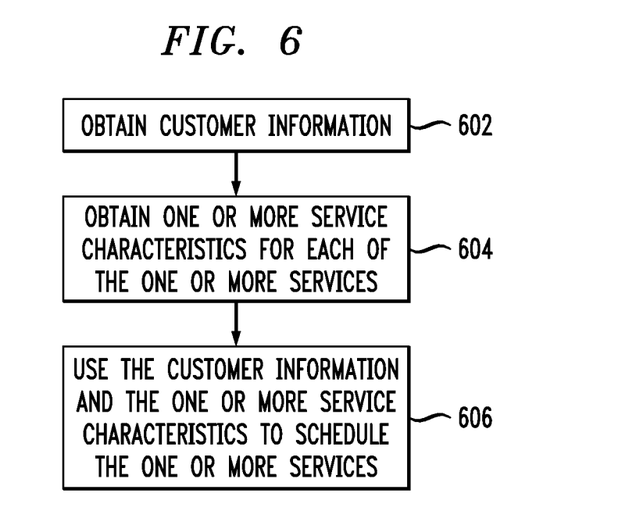
FIG. 6 is a flow diagram illustrating techniques for scheduling one or more services, according to an embodiment of the present invention.

FIG. 6 is a flow diagram illustrating techniques for scheduling one or more services, according to an embodiment of the invention. Step 602 includes obtaining customer information. The customer information can include, for example, a customer profile, wherein the customer profile includes relative importance of the customer and/or relationship of the customer with a service provider. Also, the customer information can include amount of time spent in waiting by the customer, and/or number of additional incoming customers requesting a service.

Step 604 includes obtaining one or more service characteristics for each of the one or more services. The service characteristics can include, for example, profitability, criticality, and/or resource requirements of the services.

Step 606 includes using the customer information and the one or more service characteristics to schedule the one or more services. Using the customer information and service characteristics to schedule the services can include scheduling the services based on a priority to provide a differentiated service to customers, wherein the priority can be determined using the customer information and the service characteristics. Additionally, using the customer information and service characteristics to schedule the services reduces overall average wait time for the customer.

The techniques depicted in FIG. 6 can also include, for example, obtaining resource availability (for example, dynamic resource availability), analyzing historical data to recommend operational changes to a schedule and/or scheduled services, and generating a report (for example, an MIS report) based on the one or more scheduled services.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
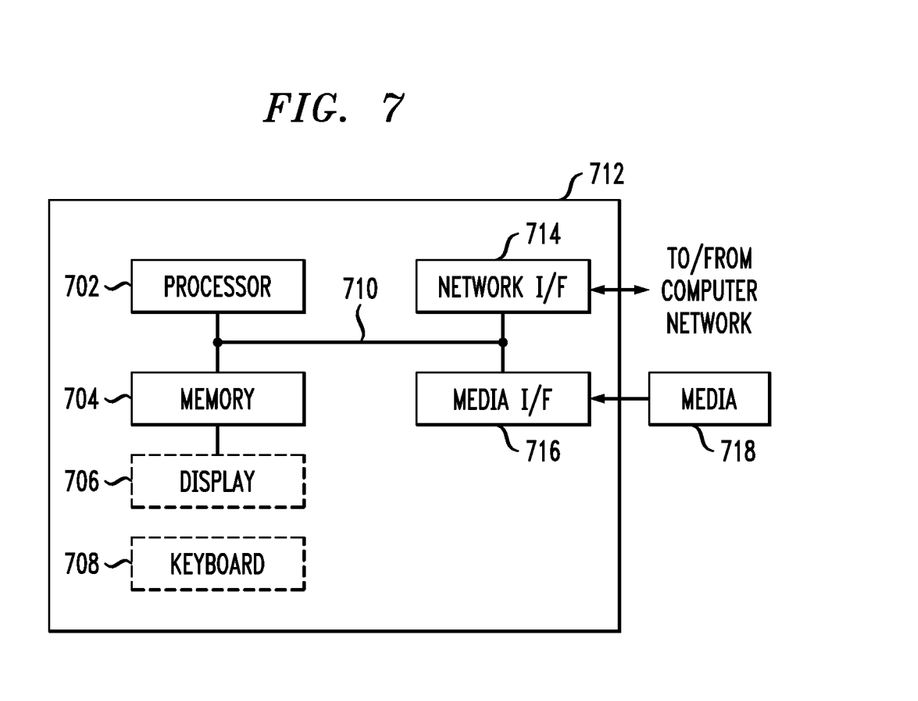
FIG. 7 is a system diagram of an exemplary computer system on which at least one embodiment of the present invention can be implemented.

The implementation may make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of this disclosure, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, this disclosure can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, simultaneously considering service characteristics and a client profile in real time for differentiated quality of service (QoS) in the presence of dynamic resource availability.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for scheduling one or more services, comprising the steps of:
    obtaining dynamically changing customer information for two or more customers, wherein the dynamically changing customer information comprises dynamic customer arrival and customer priority, and wherein obtaining customer information is carried out by a token generator module executing on a hardware processor;
    obtaining one or more dynamically changing service characteristics for each of the one or more services, wherein the one or more dynamically changing service characteristics comprise dynamic availability of resources and priority of each service, and wherein obtaining one or more service characteristics for each of the one or more services is carried out by a token generator module executing on a hardware processor; and
    using the customer information and the one or more service characteristics to schedule the one or more services to optimize one or more metrics, wherein using the customer information and the one or more service characteristics to schedule the one or more services to optimize one or more metrics comprises generating a ranked list specifying an order in which the one or more services with respect to the two or more customers should be processed, wherein the ranked list is based on simultaneous comparison of a per customer dynamic value for each of the two or more customers calculated as equal to $$P_i x \frac{MST_i - (CT - A_i)}{MST_i},$$

wherein priority ($P_i$) of a customer is updated based on a maximum wait time ($MST_i$) for the customer in connection with time already spent waiting ($CT-A_i$) by the customer, and also based on the dynamically changing customer information for each of the two or more customers and the one or more dynamically changing service characteristics for each of the one or more services, and wherein using the customer information and the one or more service characteristics to schedule the one or more services is carried out by a job scheduling algorithm module executing on a hardware processor.

2. The method of claim 1, wherein the customer information comprises a customer profile, wherein the customer profile comprises at least one of relative importance of the customer and relationship of the customer with a service provider.

3. The method of claim 1, wherein the one or more service characteristics comprise at least one of profitability, criticality, and one or more resource requirements of the one or more services.

4. The method of claim 1, wherein the customer information comprises amount of time spent in waiting by the two or more customers.

5. The method of claim 1, further comprising analyzing historical data to recommend one or more operational changes to one or more scheduled services.

6. The method of claim 1, further comprising generating a report based on the one or more scheduled services.

7. The method of claim 1, wherein the one or more metrics comprises overall average wait time for the two or more customers.

8. The method of claim 1, wherein using the customer information and the one or more service characteristics to schedule the one or more services comprises scheduling the one or more services based on a priority to provide a differentiated service to two or more customers, wherein the priority is determined using the customer information and the one or more service characteristics.

9. The method of claim 1, wherein the customer information comprises number of additional incoming customers requesting a service.

10. A computer program product comprising a non-transitory tangible computer readable recordable storage medium having computer readable program code for scheduling one or more services, said computer program product including:
    computer readable program code for obtaining dynamically changing customer information for two or more customers, wherein the dynamically changing customer information comprises dynamic customer arrival and customer priority;
    computer readable program code for obtaining one or more dynamically changing service characteristics for each of the one or more services, wherein the one or more dynamically changing service characteristics comprise dynamic availability of resources and priority of each service; and
    computer readable program code for using the customer information and the one or more service characteristics to schedule the one or more services to optimize one or more metrics, wherein using the customer information and the one or more service characteristics to schedule the one or more services to optimize one or more metrics comprises generating a ranked list specifying an order in which the one or more services with respect to the two or more customers should be processed, wherein the ranked list is based on simultaneous comparison of a per customer dynamic value for each of the two or more customers calculated as equal to $$P_i x \frac{MST_i - (CT - A_i)}{MST_i},$$

wherein priority ($P_i$) of a customer is updated based on a maximum wait time ($MST_i$) for the customer in connection with time already spent waiting ($CT-A_i$) by the customer, and also based on the dynamically changing customer information for each of the two or more customers and the one or more dynamically changing service characteristics for each of the one or more services.

11. The computer program product of claim 10, wherein the customer information comprises at least one of amount of time spent in waiting by the two or more customers, number of additional incoming customers requesting a service, and a customer profile, wherein the customer profile comprises at least one of relative importance of the customer and relationship of the customer with a service provider.

12. The computer program product of claim 10, wherein the one or more service characteristics comprise at least one of profitability, criticality, and one or more resource requirements of the one or more services.

13. The computer program product of claim 10, wherein the computer readable code for using the customer information and the one or more service characteristics to schedule the one or more services comprises computer readable program code for scheduling the one or more services based on a priority to provide a differentiated service to two or more customers, wherein the priority is determined using the customer information and the one or more service characteristics.

14. The computer program product of claim 10, further comprising computer readable program code for analyzing historical data to recommend one or more operational changes to one or more scheduled services.

15. A system for scheduling one or more services, comprising:
   a memory; and
   at least one processor coupled to said memory and operative to:
      obtain dynamically changing customer information for two or more customers, wherein the dynamically changing customer information comprises dynamic customer arrival and customer priority;
      obtain one or more dynamically changing service characteristics for each of the one or more services, wherein the one or more dynamically changing service characteristics comprise dynamic availability of resources and priority of each service; and
      use the customer information and the one or more service characteristics to schedule the one or more services to optimize one or more metrics, wherein using the customer information and the one or more service characteristics to schedule the one or more services to optimize one or more metrics comprises generating a ranked list specifying an order in which the one or more services with respect to the two or more customers should be processed, wherein the ranked list is based on simultaneous comparison of a per customer dynamic value for each of the two or more customers calculated as equal to $$P_i x \frac{MST_i - (CT - A_i)}{MST_i},$$

wherein priority ($P_i$) of a customer is updated based on a maximum wait time ($MST_i$) for the customer in connection with time already spent waiting ($CT-A_i$) by the customer, and also based on the dynamically changing customer information for each of the two or more customers and the one or more dynamically changing service characteristics for each of the one or more services.

16. The system of claim 15, wherein the customer information comprises a customer profile, wherein the customer profile comprises at least one of relative importance of the customer and relationship of the customer with a service provider.

17. The system of claim 15, wherein the one or more service characteristics comprise at least one of profitability, criticality, and one or more resource requirements of the one or more services.

18. The system of claim 15, wherein the customer information comprises at least one of amount of time spent in waiting by the two or more customers, and number of additional incoming customers requesting a service.

19. The system of claim 15, wherein in using the customer information and the one or more service characteristics to schedule the one or more services, the at least one processor coupled to said memory is further operative to schedule the one or more services based on a priority to provide a differentiated service to two or more customers, wherein the priority is determined using the customer information and the one or more service characteristics.

20. A method for real-time transaction scheduling, comprising the steps of:
   obtaining dynamically changing customer information for two or more customers, wherein the dynamically changing customer information comprises dynamic customer arrival and customer priority, and wherein obtaining customer information is carried out by a token generator module executing on a hardware processor;
   obtaining one or more dynamically changing service characteristics for each of one or more services, wherein the one or more dynamically changing service characteristics comprise dynamic availability of resources and priority of each service, and wherein obtaining one or more service characteristics for each of the one or more services is carried out by a token generator module executing on a hardware processor;
   scheduling one or more transactions in real-time based on the customer information and the one or more service characteristics according to a pre-specified criteria, wherein scheduling an iteration of transactions is carried out by a job scheduling algorithm module executing on a hardware processor; and
   repeating one or more iterations of scheduling transactions in real-time at a pre-defined interval or until all customers are served, whichever is earlier, wherein repeating one or more iterations of scheduling transactions in real-time further comprises continuously updating customer priority via calculating $$P_i x \frac{MST_i - (CT - A_i)}{MST_i},$$

wherein priority ($P_i$) of a customer is updated based on a maximum wait time ($MST_i$) for the customer in connection with time already spent waiting ($CT-A_i$) by the customer.

* * * * *